United States Patent [19]

Bristow

[11] Patent Number: 5,121,651
[45] Date of Patent: Jun. 16, 1992

[54] NORMAX QUICK RELEASE BRACKET

[76] Inventor: Norman W. Bristow, 1040 35th St., Columbus, Ga. 31904

[21] Appl. No.: 505,352

[22] Filed: Apr. 4, 1990

[51] Int. Cl.$^5$ .................. G05G 11/00; B60K 24/306
[52] U.S. Cl. ........................... 74/481; 403/77; 403/122
[58] Field of Search ............... 74/481, 482, 484; 403/77, 122

[56] References Cited

U.S. PATENT DOCUMENTS

| 1,906,366 | 5/1932 | Burn | 74/481 |
| 3,065,647 | 11/1962 | Whitmore | 74/481 |
| 3,400,408 | 9/1968 | Garcia | 403/77 X |
| 4,324,309 | 4/1982 | Ginley | 74/481 X |
| 4,788,879 | 12/1988 | Ulrich | 74/482 X |

Primary Examiner—Richard E. Moore

[57] ABSTRACT

A control system for a paraplegic or double amputee for the hand operation of throttle and brake pedals of an automotive vehicle consisting of two bracket assemblies for removable attachment to a brake or throttle pedal, each assembly being swivably connected to an adjustable length rod so that the user can remotely manipulate the pedal by hand.

2 Claims, 2 Drawing Sheets

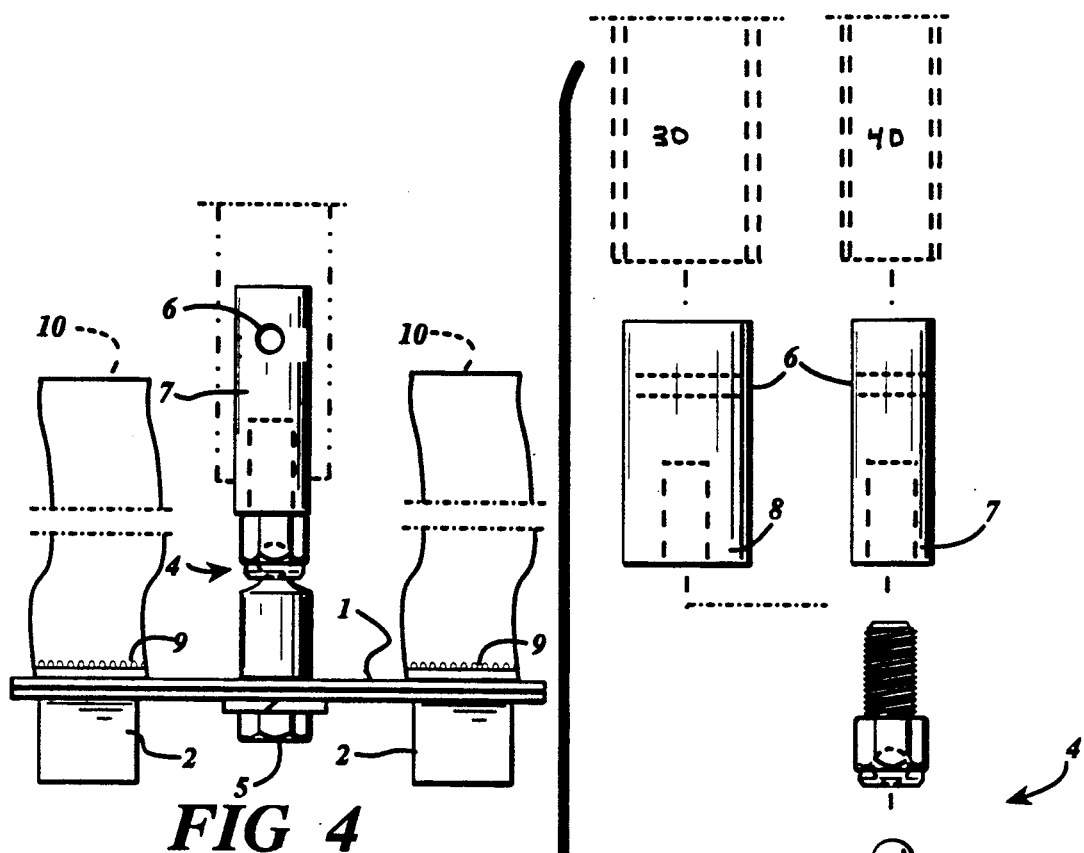
FIG 4
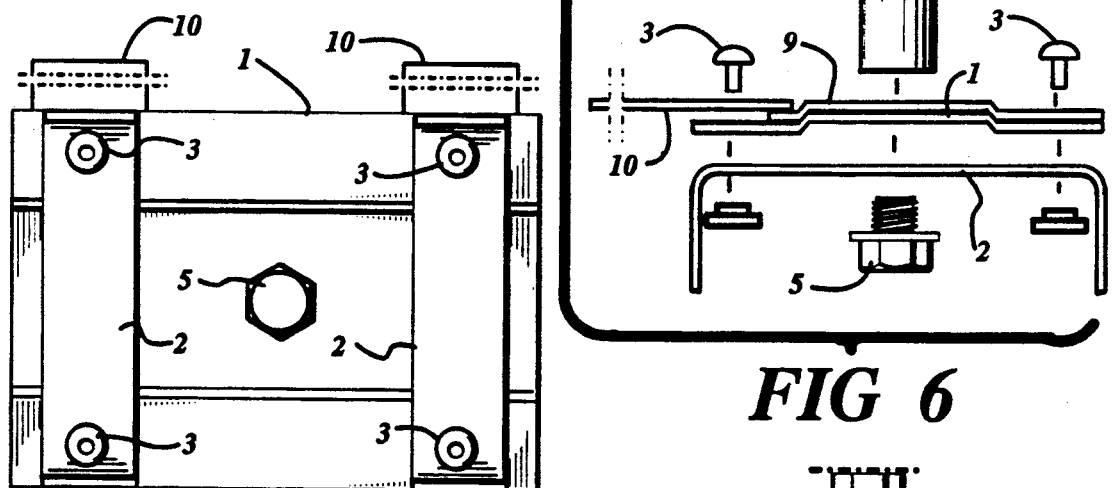
FIG 5
FIG 6
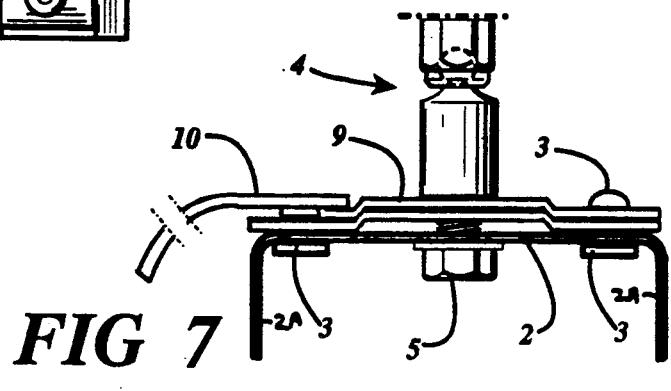
FIG 7

NORMAX QUICK RELEASE BRACKET

BACKGROUND OF THE INVENTION

This invention relates generally to devices for operating the throttle and brake pedals of a conventional automotive vehicle with either hand.

Previously, the devices for those temporarily or permanently disabled in their lower extermities for operating a motor vehicle with their hands involved a great deal of conversion of the vehicle. This is usually at great expense and many hours of effort, making the device a fixed structure in the automotive vehicle. Furthermore, this makes it cumbersome and irritating for able bodied people to operate the vehicle with their feet. The devices could not be easily transported from one vehicle to another and complicated installation and removal, usually at great expense and time. The present invention solves all the above-mentioned problems by providing a device that is simple and inexpensive to produce. The device is also of lightweight construction and is easily transportable and transferrable from one vehicle to another. The current invention requires no tools and can be installed or removed merely by hand in a matter of minutes, thereby solving all of the above outlined problems.

U.S. Pat. No. 2,777,335 teaches a hand control device for controlling throttle and brake pedals which will not interfere with the normal operation of said pedals in an automotive vehicle, while the normal operation of said pedals in an automotive vehicle, while being adaptable to different vehicles. It is not easily installed or removed and therefore it is not portable. U.S. Pat. No. 2,724,285 teaches a device for operating the foot pedals of a motor vehicle. That device is fixedly attached to said pedals in such a way that it is not easily installable or transferable and will encumber the operation of said pedals by those able bodied people who would wish to operate the motor vehicle with their feet. U.S. Pat. No. 2,602,348 teaches a hand control device for motor vehicles which is fixedly attached to the throttle and brake pedals of said motor vehicle and which is not easily installable or removable and therefore is not portable. U.S. Pat. No. 2,855,797 teaches an automobile drive control which employs a single horizontal handle bar pivotally attached to two vertical cross control rods which are fixedly attached to the brake and throttle pedals of an automobile in a permanent manner. A handle bar is attached to the steering column of the automobile in a fixed manner such that said device is not easily installed or removed from an automobile making said device non-portable.

It may be concluded that the above identified references do not disclose a device for hand operation of throttle and brake pedals having the features of: easy installation or removal merely by hand, inexpensive, lightweight, transportable, and adaptability such that the controls may be used repeatedly on any vehicle. U.S. Pat. No. 4,788,879 teaches a device of the general type claimed but lacks the recited VELCRO for quick installation and removal and repeated use, adaptability to be operated by either hand.

The 90° angle of the tabs or break sides prevent slippage on foot pedals. The VELCRO are wrapped completely around foot pedals and connector plates for a more secure attachment. U.S. Pat. No. 4,324,309 teaches a device that is not hand controls, but does suggest using VELCRO straps for quick attachment. However, the VELCRO straps are used to attach the device to the stump of a leg, not the foot pedals of a motor vehicle. It is also not portable. It may be concluded that although the above references do disclose devices of the general type claimed by the present invention, they lack certain advantages that are claimed in the present invention, such as the use of existing parts that are easily attainable in the available market; inexpensive; and, a damper control swivel for a ball joint connector. The present invention has a simple construction of connector plate with 90° angle tabs or a single construction of a 90° break on sides of connector plate. VELCRO straps wrap completely around foot pedals for a more secure attachment.

SUMMARY OF THE INVENTION

Applicant's invention is for the hand operation of throttle and brake pedals on a conventional automotive vehicle. The invention includes a first brake rod having upper and lower ends; a bracket means operably attached to said lower end of said second brake rod for operably engaging said brake pedal of said automotive vehicle; a throttle rod having upper and lower ends; and a bracket means operably engaged to said lower end of said throttle rod for operably engaging the throttle pedal of the vehicle.

The user of the present invention sits in the driver's seat of a conventional automotive vehicle and adjusts the brake rod, such that the bracket means operable engages the brake pedal of said vehicle at a length which places a handle attached to the brake rod comfortable in the hand of the user. Then, the user adjusts the throttle rod such that it operably engages the throttle pedal at a length which allows the thumb of the user to comfortably operate a second handle attached to the throttle rod. Thus, the user of the invention is able to operate both the throttle and brake pedals of a vehicle with either hand.

Additionally, objects of Applicant's invention are that it is easily installed or removed merely by hand, lightweight, adjustable, transportable, transferrable, and inexpensive.

BRIEF DESCRIPTION OF THE DRAWINGS

FIG. 4 is a side view of the present invention.

FIG. 5 is a bottom view of the bracket of the present invention.

FIG. 6 is an exploded side view of the present invention.

FIG. 7 is side view of the bracket of the present invention rotated 90° from the view of FIG. 4.

DESCRIPTION OF THE PREFERRED EMBODIMENTS

Figure 1:
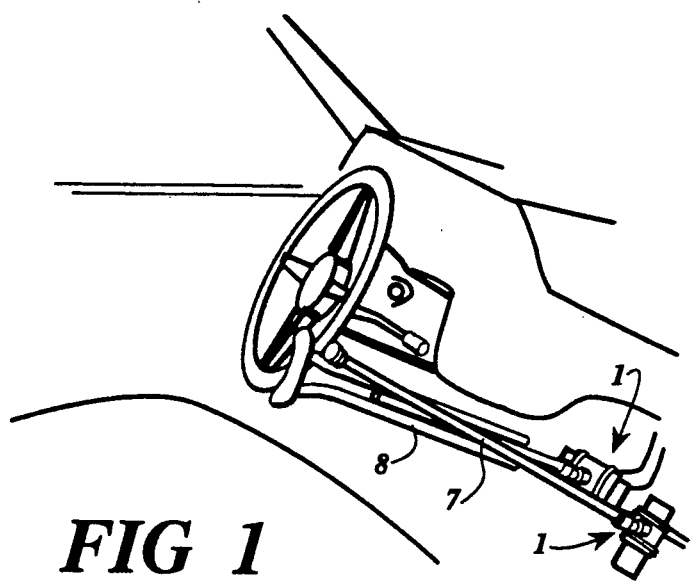
FIG. 1 shows applicant's invention in use in a cut away portion of an automotive vehicle.

Referring generally to the drawings, a first brake connector plate 1 comprises a 1/16" thick aluminum 3.5"×2.5" plate having a ⅜" hole drilled and centered. Four ⅛" holes drilled in each corner, 0.5" in along 2.5" side of connector plate 1 and 0.25" in on 3.5" side of said connector plate 1. Two each 0.5"×3.5", 1/32" thick steel strapping material 9 is used, 2.5" of each end is bent at a 90° angle and riveted by rivet 3 to the bottom of first connector plate 1. In an alternative embodiment brake connector plate 1 is made of a single piece of 1/16" aluminum 3.5"×3.5" with 90° 0.5" breaks along two parallel sides forming a bracket 3.5"×2.5" in one solid piece, thus eliminating the need for steel strapping material. The 90° angle tabs 2A or the 90° break prevent slippage on pedal 11. Tabs 2 and 2A maintain proper alignment of assembly with pedal 11, and prevent assembly 20 slipping off pedal 11.

First brake rod 8 is a generally straight rigid rod, as shown in FIG. 11. A second throttle rod 7 is similarly a generally straight rigid rod having a flat surface on the upper end for operable engagement with the thumb of the user.

As shown in FIG. 6, a first control swivel 4 comprises a mated ball and socket assembly having a threaded male upper end and a threaded female lower end. First control swivel 4 is fixedly attached to lower end of brake rod 8 by means of the male upper end of swivel 4. The male end of swivel 4 is operably attached to the female end of brake rod 7. First control swivel 4 is fixedly attached to first brake connector plate 1 by means bolt 5 passing through the centered hole on plate 1 and connecting to the threaded of lower female end 5.

A second control swivel 4 is fixedly attached in the same manner of first control swivel 4 to second throttle rod 7 on its lower end. Second control swivel 4 is fixedly attached to second connector plate 1 by means of a threaded bolt 5 passing through the aperture on plate 1 and connecting to the threaded female end of swivel 4.

In an alternative embodiment, rod 7 or 8 may have a transverse hole 6 drilled through the rod. This rod 7A or 8A shown in FIG. 6, but not labelled, can be attached with a roll pin to a hollow rod 30 or 40 by means of a standard roll pin. This embodiment permits removable attachment of assembly 20, shown in FIG. 2, using a shorter rod 7 or 8 to a separate rod, thus allowing further dismantlement of the unit for easy portability.

Figure 2:
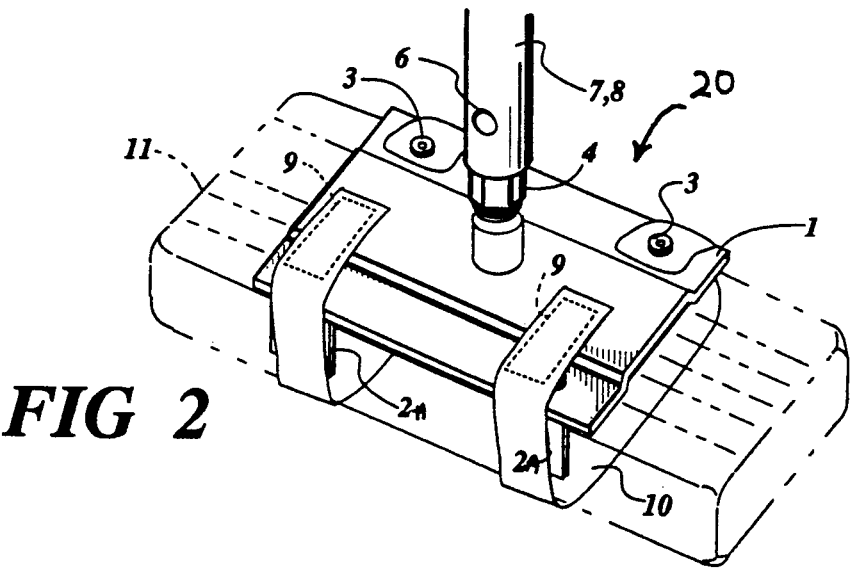
FIG. 2 is a plan view of the invention attached to a pedal shown in phantom.
Figure 3:
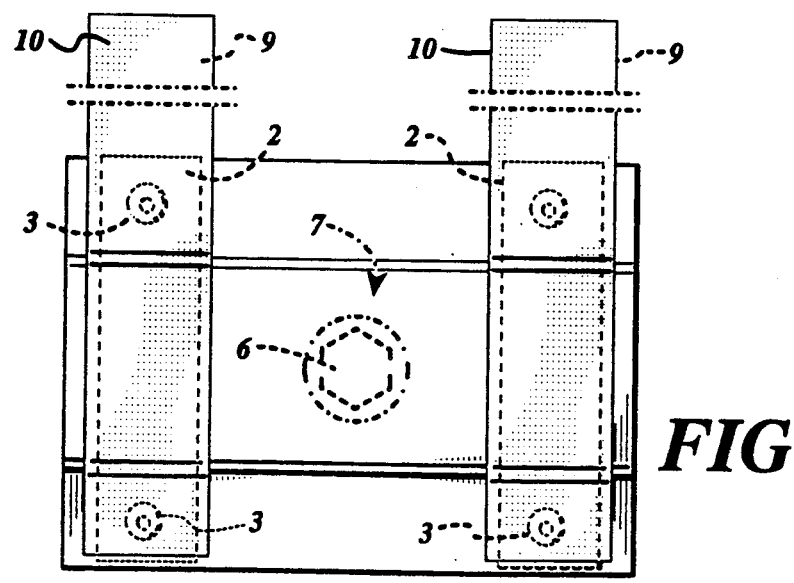
FIG. 3 is a top view of the bracket of the present invention.

Two each 0.75"×2.5" long VELCRO straps 9 (hook side) are glued and riveted with rivet 3 on the top side of connector plate 1 along the 2.5" side as shown in FIGS. 2 and 3. Two each 0.75"×6" long VELCRO straps 10 (loop side) are glued and riveted with rivet 3 on one end, on 3.5" side of connector plate 1, leaving the opposite end free to wrap completely around the foot pedal 11 of the vehicle and said connector plate 1 attaching to said hook side of said VELCRO strap 9 fixedly attached to top side of connector plate 1.

As shown in FIG. 2, one assembly 20 is firmly attached to foot pedal 11 (shown in phantom) of the vehicle by placing the bottom side of brake connector plate 1 onto the top side of a brake pedal 11 and wrapping the VELCRO straps 10 around foot pedal 11 firmly attaching VELCRO straps 10 to the top of connector plate 1 and VELCRO straps 9. The same attachment procedure is done to throttle connector plate 1 as above on top side of a throttle pedal 11 allowing the user to manipulate foot pedal 11 by the use of either the right or left thumb and hand on rod 7 or 8.

Numerous modifications and variations of the disclosed embodiments will become apparent to those skilled in the art without deviating from the invention as defined in the attached claims.

I claim:

1. A removable bracket assembly for operable engagement of a motor vehicle brake or throttle pedal, comprising, in combination:

a connector bracket comprising a substantially flat rectangular plate having a top and a bottom surface and having a parallel outer portion of two opposite parallel sides disposed downwards towards each other at a substantially right angle in the same direction defining a pair of tabs, said connector bracket containing an aperture sized to receive a threaded male fastening means;

a swivel mounting means comprising a mated ball and socket connector having a threaded male fastening means end and a threaded female end, said female end being fixedly attached to the top surface of said plate by means of a threaded male fastening means associated with said plate; and a removable fastening means comprising at least one set of flexible hook and loop straps comprising a first and a second strap whereby said first strap is fixedly attached to the top surface of said bracket and one end of said second strap being fixedly attached to the top side of said bracket such that the free end of said second strap can wrap around the bottom of said bracket assembly and said pedal to removably fasten to said first strap resulting in the operable engagement of the bottom side of said bracket assembly with the top surface of said pedal.

2. A portable hand control system for operation of the brake and throttle of a motor vehicle by a user with either hand from the driver's seat, comprising, in combination:

a brake rod having upper and lower ends, said lower end having a threaded female aperture disposed axially to said rod;

a throttle rod having upper and lower ends, said lower end having a threaded female aperture disposed axially to said rod;

a first and second bracket assembly, each separately comprising, in combination a removable bracket assembly for operable engagement of a motor vehicle brake or throttle pedal, comprising, in combination:

a connector bracket comprising a substantially flat rectangular plate having a top and a bottom surface and having a parallel outer portion of two opposite parallel sides disposed downwards towards each other at a substantially right angle in the same direction defining a pair of tabs, said connector bracket containing an aperture sized to receive a threaded male fastening means;

a swivel mounting means comprising a mated ball and socket connector having a threaded male fastening means end and a threaded female end, said female end being fixedly attached transversely to the top surface of said plate by means of a threaded male fastening means associated with said plate, said female end being fixedly attached to a threaded male end of a rod; and a removable fastening means comprising at least one set of flexible hook and loop straps comprising a first and a second strap whereby said first strap is fixedly attached to the top surface of said bracket and one end of said second strap being fixedly attached to the top side of said bracket such that the free end of said second strap can wrap around the bottom of said bracket assembly and said pedal to removably fasten to said first strap resulting in the operable engagement of the bottom side of said bracket assembly with the top surface of said pedal, said first bracket assembly fixedly attached to said lower end female aperture of said brake rod by said threaded male end of said swivel mounting means; and said second bracket assembly fixedly attached to said lower end of said female aperture of said throttle rod by said threaded male end of said swivel mounting means.

* * * * *